(12) United States Patent
P

(10) Patent No.: US 9,307,043 B2
(45) Date of Patent: Apr. 5, 2016

(54) STAGING ENGINE

(71) Applicant: Meenakshi Sundaram P, Walldorf (DE)

(72) Inventor: Meenakshi Sundaram P, Walldorf (DE)

(73) Assignee: SAP SE, Walldorf (DE)

( * ) Notice: Subject to any disclaimer, the term of this patent is extended or adjusted under 35 U.S.C. 154(b) by 385 days.

(21) Appl. No.: 13/941,168

(22) Filed: Jul. 12, 2013

(65) Prior Publication Data
US 2015/0019760 A1    Jan. 15, 2015

(51) Int. Cl.
G06F 15/16 (2006.01)
H04L 29/08 (2006.01)
H04L 29/06 (2006.01)

(52) U.S. Cl.
CPC ........ H04L 67/2833 (2013.01); H04L 63/0209 (2013.01)

(58) Field of Classification Search
CPC ..................... H04L 67/2833; H04L 63/0209
USPC ................. 709/212–215, 246–247, 202–203, 709/217–219, 249
See application file for complete search history.

(56) References Cited

U.S. PATENT DOCUMENTS

| 7,555,558 | B1 * | 6/2009 | Kenrich | ................... H04L 67/06 709/203 |
| 7,836,104 | B2 | 11/2010 | Schemer et al. | |
| 7,974,896 | B2 | 7/2011 | Busse et al. | |
| 8,055,777 | B2 | 11/2011 | Noda et al. | |
| 8,166,130 | B2 * | 4/2012 | Reinart | ................... G06F 9/541 709/246 |
| 8,321,860 | B2 * | 11/2012 | Andersen | ................. G06F 8/60 709/202 |
| 8,417,588 | B2 | 4/2013 | Ringl et al. | |
| 8,504,650 | B2 * | 8/2013 | Reinart | .................... G06F 9/541 709/246 |
| 8,606,878 | B2 * | 12/2013 | Ferris | .................. H04L 12/4641 709/219 |
| 8,811,697 | B2 * | 8/2014 | Sofka | ..................... G06F 19/321 382/128 |
| 8,924,560 | B2 * | 12/2014 | Pang | .................... G06F 9/45558 709/203 |
| 2003/0051047 | A1 | 3/2003 | Horel et al. | |
| 2005/0021348 | A1 | 1/2005 | Chan et al. | |
| 2005/0071285 | A1 | 3/2005 | Laicher et al. | |
| 2005/0071348 | A1 | 3/2005 | Laicher et al. | |
| 2005/0216497 | A1 | 9/2005 | Kruse et al. | |
| 2010/0131616 | A1 | 5/2010 | Walter et al. | |
| 2010/0332665 | A1 | 12/2010 | Jolfaei | |
| 2012/0041922 | A1 | 2/2012 | Vainer et al. | |
| 2012/0124645 | A1 | 5/2012 | Ratica et al. | |
| 2012/0185564 | A1 | 7/2012 | Reinart | |
| 2014/0089456 | A1 * | 3/2014 | Ferris | .................. H04L 12/4641 709/213 |
| 2014/0214805 | A1 * | 7/2014 | Elias | ................. G06F 17/30522 707/722 |

* cited by examiner

Primary Examiner — Bharat N Barot
(74) Attorney, Agent, or Firm — Schwegman Lundberg & Woessner, P.A.

(57) ABSTRACT

Example methods and systems are directed to a staging engine. A system may comprise two computing devices. The first computing device may be accessible to a plurality of users. The second computing device may be inaccessible to the plurality of users, but accessible by the first computing device. The first computing device may cause a user interface ("UI") to be presented to a user accessing the first computing device. The UI may include data retrieved from the second computing device and may be operable to store data. The data entered into the UI for storage may be incomplete relative to the data structures expected by the second computing device. The first computing device or the second computing device may stage the data until additional data that completes the expected data structures is received. After the expected data is complete, the data may be stored.

19 Claims, 10 Drawing Sheets

STAGING ENGINE

TECHNICAL FIELD

The subject matter disclosed herein generally relates to the processing of data. Specifically, the present disclosure addresses systems and methods to provide a staging engine for handling multiple transactions.

BACKGROUND

A service provider may make a server application available over a public network to process requests. The server application may need certain data fields to be present in order to process each request.

BRIEF DESCRIPTION OF THE DRAWINGS

Some embodiments are illustrated by way of example and not limitation in the figures of the accompanying drawings.

DETAILED DESCRIPTION

Example methods and systems are directed to a staging engine. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A system may comprise two computing devices. The first computing device may be accessible to a plurality of users (e.g., be publicly accessible, be accessible to users having certain credentials, or both). The second computing device may be inaccessible to the plurality of users (e.g., by rejecting login attempts from the users, by not being connected to the same network as the users, or both), but accessible by a user account of the first computing device (e.g., through different user credentials, by using a separate network connection, or both). The second computing device may also be accessible by a different plurality of users (e.g., by using different login credentials, by being connected over a different network, or both).

In some example embodiments, the first computing device causes a user interface ("UI") to be presented to a user accessing the first computing device. The UI may include data retrieved from the second computing device. The UI may be operable to store data. In some example embodiments, the data entered into the UI for storage may be incomplete relative to the data structures expected by the second computing device. In these example embodiments, the first computing device or the second computing device may stage the data until additional data that completes the expected data structures is received. After the expected data is complete, the data may be stored.

Figure 1:
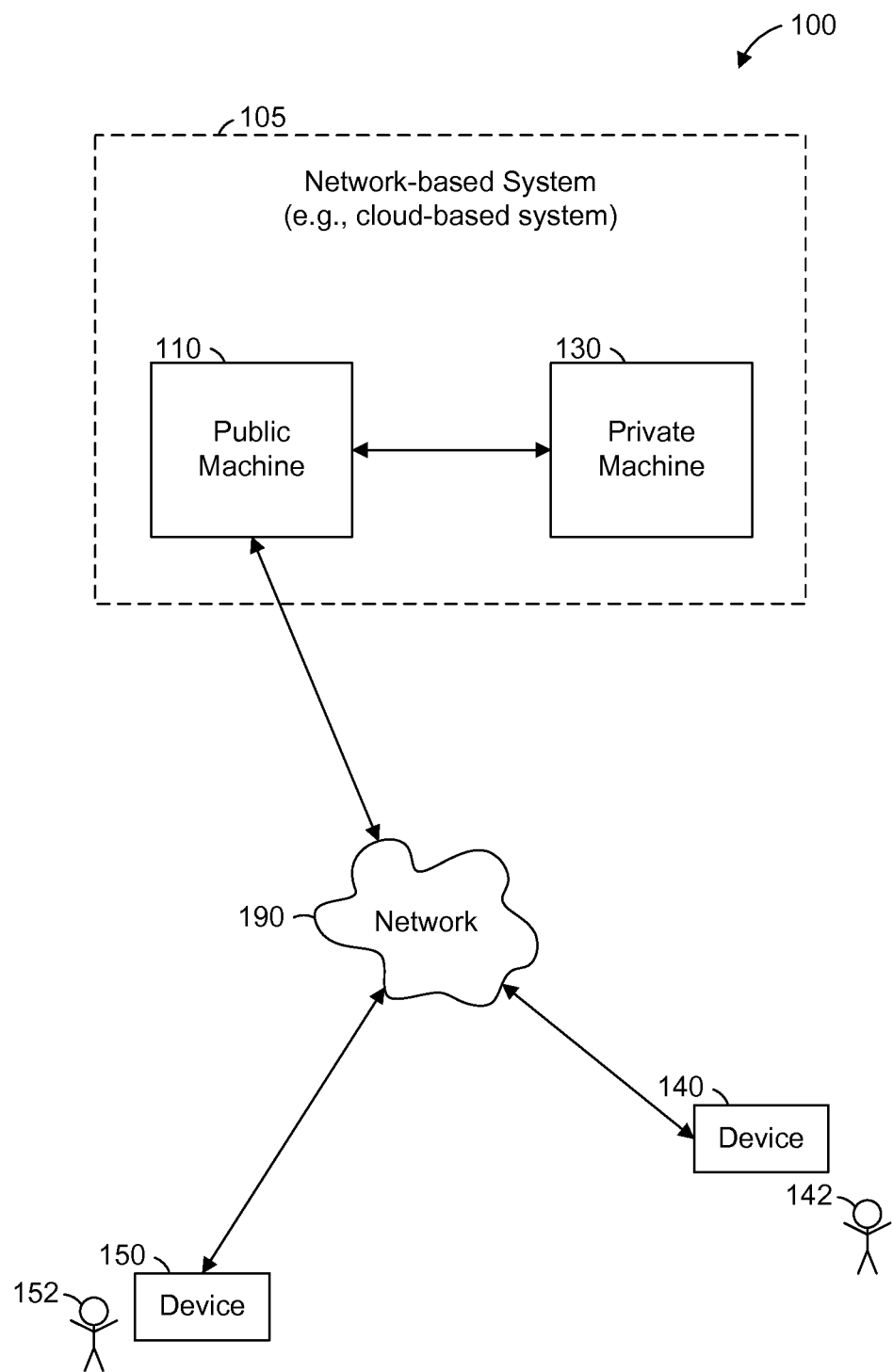
FIG. 1 is a network diagram illustrating a network environment suitable for implementing a staging engine, according to some example embodiments.

FIG. 1 is a network diagram illustrating a network environment suitable for implementing a staging engine, according to some example embodiments. The network environment 100 includes a public machine 110, a private machine 130, and devices 140 and 150, all communicatively coupled to each other via a network 190. The network-based system 105 may comprise the two machines 110 and 130, and may present a single interface to the network 190. The machines 110 and 130 and the devices 140 and 150 may each be implemented in a computer system, in whole or in part, as described below with respect to FIG. 10.

The devices 140, 150 may present UIs configured to show data received from the public machine 110, configured to generate requests to the public machine 110, or both. The public machine 110 may be accessible by the devices 140, 150 via the network 190. Requests from the devices 140, 150 may be responded to with data stored on the public machine 110, may prompt the public machine 110 to request data from the private machine 130, or both. The private machine 130 may be accessible by the public machine 110 and be inaccessible by the devices 140, 150 via the network 190. Requests to the private machine 130 from the public machine 110 may be responded to with data stored on the private machine 130, may prompt the private machine 130 to request data from another machine, or both.

Also shown in FIG. 1 are users 142 and 152. One or both of the users 142 and 152 may be a human user, a machine user (e.g., a computer configured by a software program to interact with the device 140), or any suitable combination thereof (e.g., a human assisted by a machine or a machine supervised by a human). The user 142 is not part of the network environment 100, but is associated with the device 140 and may be a user of the device 140. For example, the device 140 may be a desktop computer, a vehicle computer, a tablet computer, a navigational device, a portable media device, or a smart phone belonging to the user 142. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the public machine 110 and the device 140). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
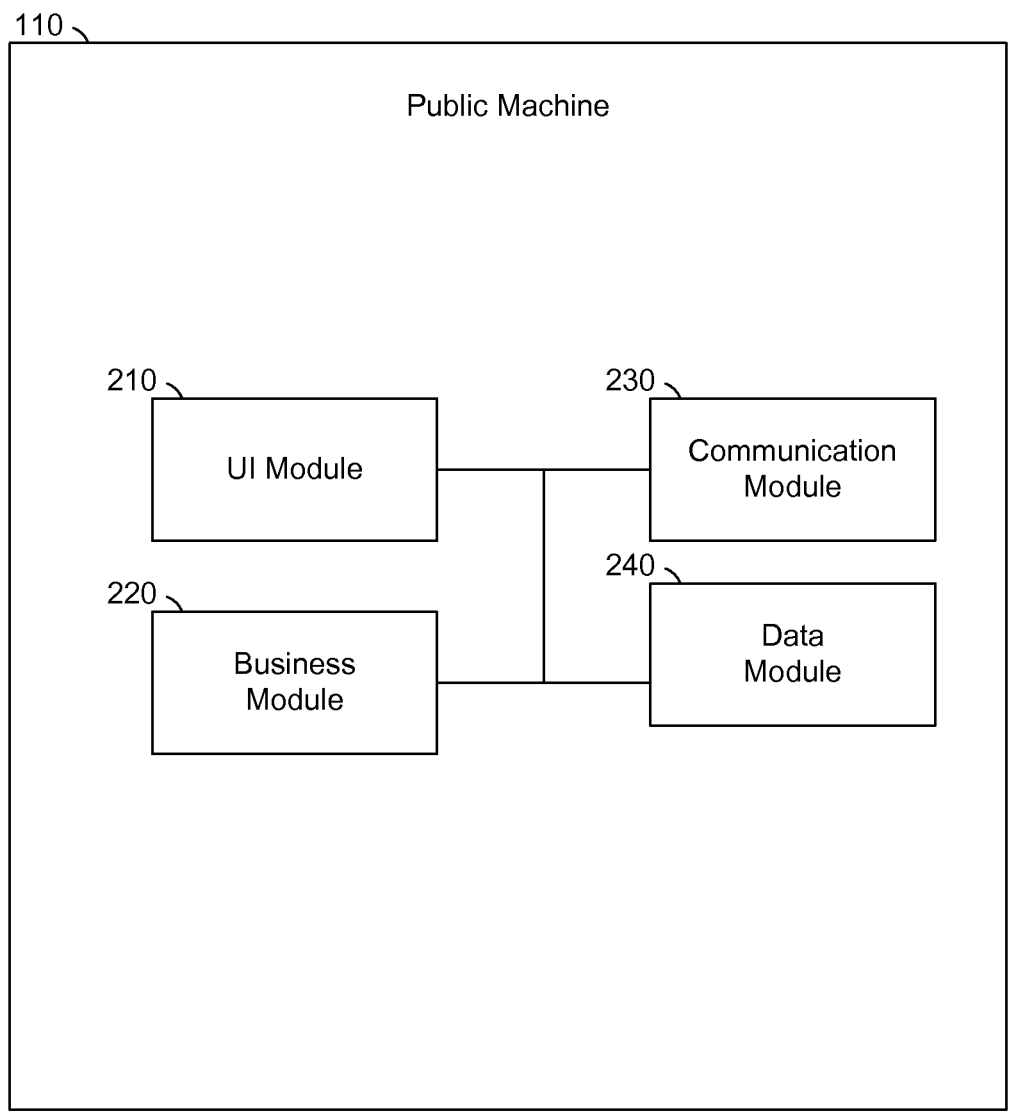
FIG. 2 is a block diagram illustrating components of a public machine suitable for implementing a staging engine, according to some example embodiments.

FIG. 2 is a block diagram illustrating components of a public machine suitable for implementing a staging engine, according to some example embodiments. The public machine 110 is shown as including a UI module 210, a business module 220, a communication module 230, and a data module 240 all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The UI module 210 may cause a UI (e.g., an application interface, a web browser interface, or both) to be presented to a user device accessing the public machine 110. The UI may be operable to request data from the public machine 110 via the communication module 230. For example, the UI may present a query interface to the user and the user may enter or select a query. The resultant query may constitute a request for data from the public machine 110. The business module 220 may process the request and generate a request for the responsive data. Alternatively or additionally, the business module 220 may process the request and determine that the request is not ready for processing by the private machine 130. In this case, the data module 240 may store a portion or all of the request. After a later interaction with the UI module 210, the business module 220, in conjunction with the data module 240, may determine that the later interaction has provided additional information for processing the request. At that time, the business module 220 may process the request and generate a request for the responsive data. The communication module 230 may send the request for the responsive data to the private machine 130, and receive responsive data from the private machine 130. The business module 220 may process the responsive data and may prepare it for presentation. The UI module 210 may present the responsive data to the user.

Figure 3:
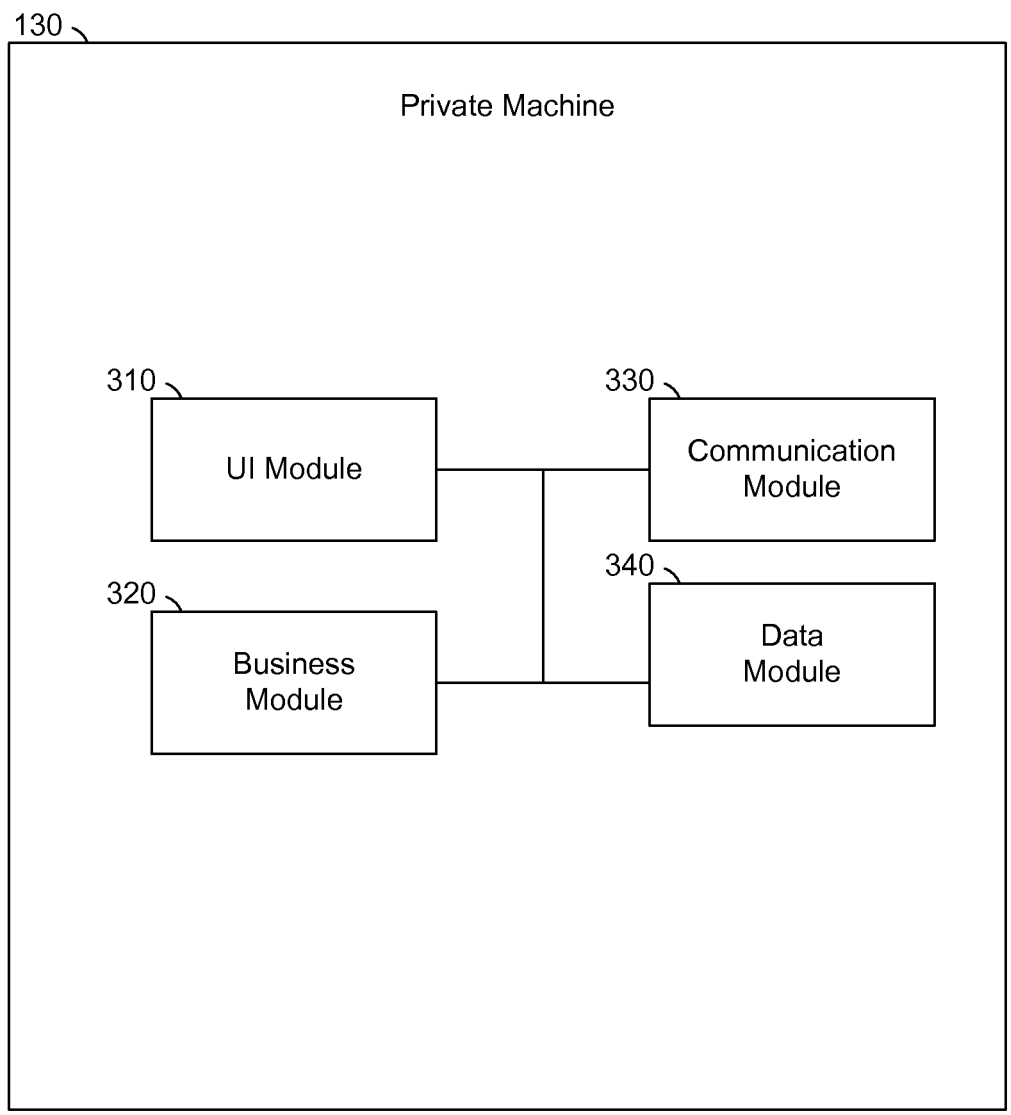
FIG. 3 is a block diagram illustrating components of a private machine suitable for implementing a staging engine, according to some example embodiments.

FIG. 3 is a block diagram illustrating components of a private machine suitable for implementing a staging engine, according to some example embodiments. The private machine 130 is shown as including a UI module 310, a business module 320, a communication module 330, and a data module 340, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The UI module 310 may cause a UI (e.g., an application interface, a web browser interface, or both) to be presented to a user device accessing the private machine 130. The user device may access the private machine 130 through a different network than the network 190. Requests may also be received via the communication module 330, e.g., from the public machine 110. The business module 320 may process the request and generate a request for the responsive data. The data module 340 may determine that the responsive data is stored in the private machine 130 and supply the responsive data. In some example embodiments, the communication module 330 may send the request for the responsive data to another machine and receive the responsive data from the other machine. The data module 340 may store the responsive data. The business module 320 may process the responsive data and may prepare it for presentation. The business module 320 may determine whether the request is complete or incomplete (e.g., is missing expected data fields, parameters, or both). When the request is incomplete, it may be rejected instead of processed. When the request is received through the UI module 310, the UI module 310 may present the responsive data to the user. When the request is received through the communication module 330, the communication module 330 may respond with the responsive data.

Figure 4:
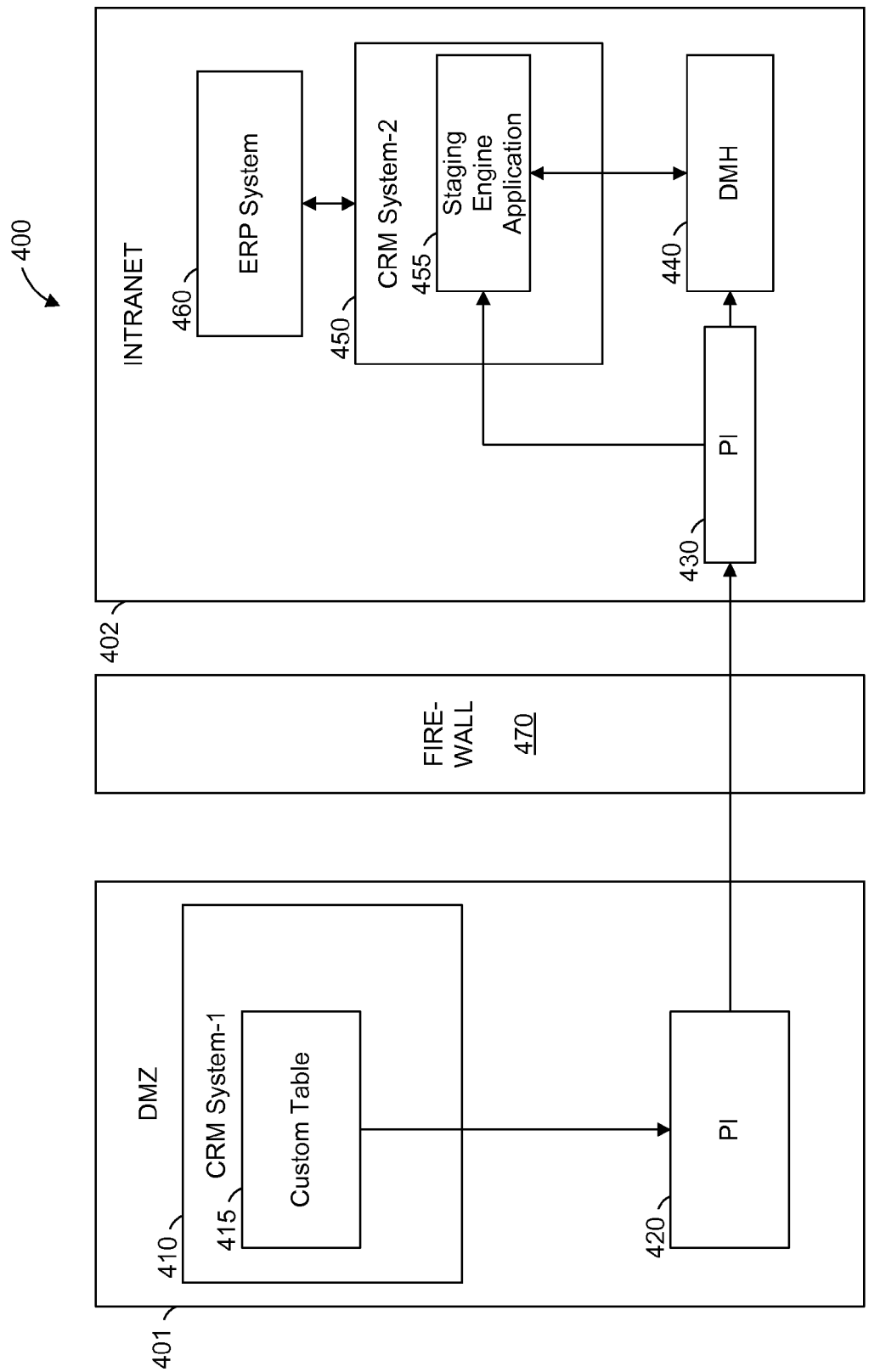
FIGS. 4-5 are block diagrams illustrating components of a system suitable for implementing a staging engine, according to some example embodiments.

FIG. 4 is a block diagram illustrating components of a system 400 suitable for implementing a staging engine, according to some example embodiments. The system 400 comprises the demilitarized zone ("DMZ") 401 and the intranet 402 connected via the process integration ("PI") interfaces 420, 430, communicating through the firewall 470.

The CRM System-1 410 may host an application UI (e.g., a business server page UI, an Adobe form UI, a web Dynrpo UI, a web UI, or any suitable combination thereof). The user may input data in the application UI, which may then be stored in the custom table 415

The data from the custom table 415 may be replicated to a staging engine in the CRM System-2 450 via PI interfaces 420, 430. The PI interfaces may be proxy web services. In some example embodiments, connecting the CRM System-1 410 with the CRM System-2 450 via the PI interfaces 420, 430 provides better data security.

The PI connection may be unidirectional (e.g., data from the CRM System-1 410 may be sent to the CRM System-2 450 while data is not sent from the CRM System-2 450 to the CRM System-1 410). When the data is populated in the staging engine application 455 in the CRM System-2 450, a document (e.g., a lead, an opportunity, an activity, a sales order, a transaction document, a one order document, or any suitable combination thereof) may be created based on the data. When the document is created, it may be replicated to the ERP system 460 based on its status.

The staging engine application 455 may be designed as a web UI application with which the user can create a document. In some example embodiments, the document available to be created is based on the data qualification. The staging engine application 455 may have a custom data model. The staging engine application 455 may be highly customizable and supported by a technical framework. The technical framework may wrap standard CRM middleware and may provide options for default values. For example, if it is desired to create a document based on data that is incomplete, default values may be used to fill in the missing fields. In some example embodiments, a data management hub ("DMH") 440 is used to check for duplicates. When a duplicate is detected, the existing data may be used. In some example embodiments, the account and contact person should be created before the creation of a one order document referring to the account and contact person. The desired order of events may be handled by the staging engine application 455 or the technical framework.

Using the technical framework, fields in the UI may be generated in a run time module based on data stored in a database. The technical framework may provide the flexibility to add or remove fields for different documents without modifying program code. The technical framework may also provide options to create different scenarios (e.g., workflows, documents, dependencies, or any suitable combination thereof).

Figure 5:
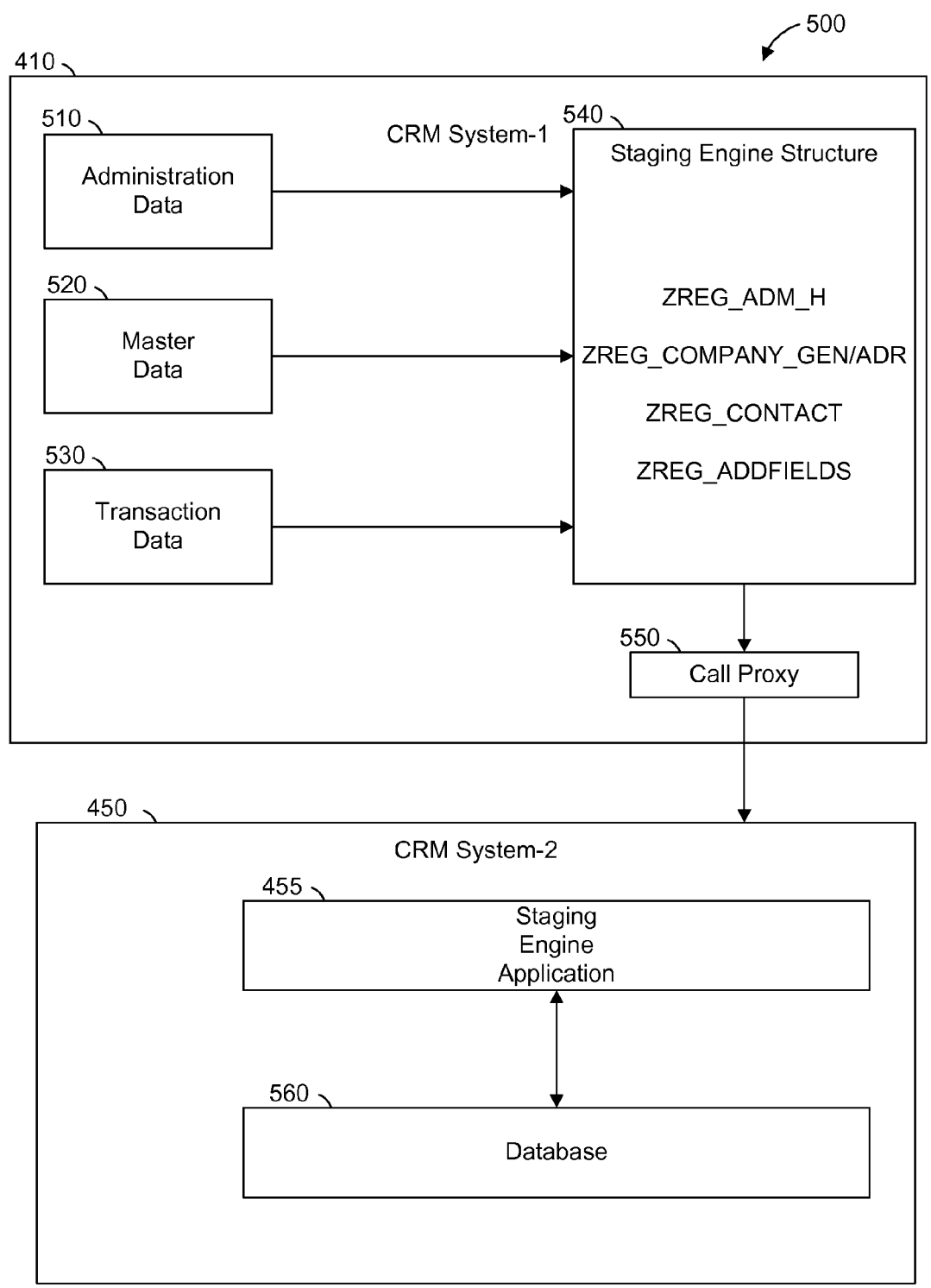

FIG. 5 is a block diagram illustrating components of a system 500 suitable for implementing a staging engine, according to some example embodiments. The system 500 comprises the CRM System-1 410 and the CRM System-2 450 connected by a network connection, e.g., a connection via the call proxy 550.

The staging engine UI may be a web UI flexibly created by being dynamically rendered based on customized tables. Data received by the CRM System-1 410 UI may include a variety of sections (for example, administration data 510, master data 520, transaction data 530, or any suitable combination thereof). The master data 520 may include company details, contact person details, or both. The transaction data 530 may include a description, a start date, an end date, a product, a quantity, survey details, an expected number of licenses, an expected total value, a contract duration, a currency, or any suitable combination thereof. The data from the different sections of the UI may be technically mapped to different structures in the staging area 540. For example, the administration data 510 may be mapped to a ZREG_ADM_H structure in the staging area 540, the master data 520 may be mapped to a ZREG_COMPANY_GEN/ADR structure and a ZREG_CONTACT structure, and the transaction data 530 may be mapped to a ZREG_ADDFIELDS structure.

The data from the CRM System-1 410 may be converted to a single extensible markup language ("XML") string and passed by the PI call proxy 550 to the CRM System-2 450. The data may also be persisted in a normalized manner in different tables in the database 560 by the staging engine application 455. The proxy service in the CRM System-2 450 may unwrap the single string to extract the individual structures for administration data, company data, contact person data, transaction data, etc. and render the details in a Staging Engine UI.

Based on the data quality, a transaction (e.g., a one order document) can be created from the staging engine. Example transactions include activity, lead, and opportunity. Options may be provided in the staging engine to check for duplicate entries (e.g., duplicate accounts, contact persons, etc.) In some example embodiments, a data management hub is used to check for duplicates. When a duplicate is detected, the existing data may be used. In some example embodiments, the account and contact person should be created before the creation of a one order document referring to the account and contact person. The desired order of events may be handled by the staging engine framework.

The staging engine may present a UI divided into sections. The sections may correspond to different data groups. For example, a company data group may have fields such as prospect company name, address, city, postal code, state country, uniform resource locator ("URL"), or any suitable combination thereof. As another example, a contact data group may have fields such as salutation, first name, last name, prospect contact phone number, prospect contact email, function, department, language, or any suitable combination thereof. Similarly, the transaction data group may have fields such as description, start date, end date, product, expected number of licenses, expected total value, contract duration, currency, questionnaire, or any suitable combination thereof.

Figure 6:
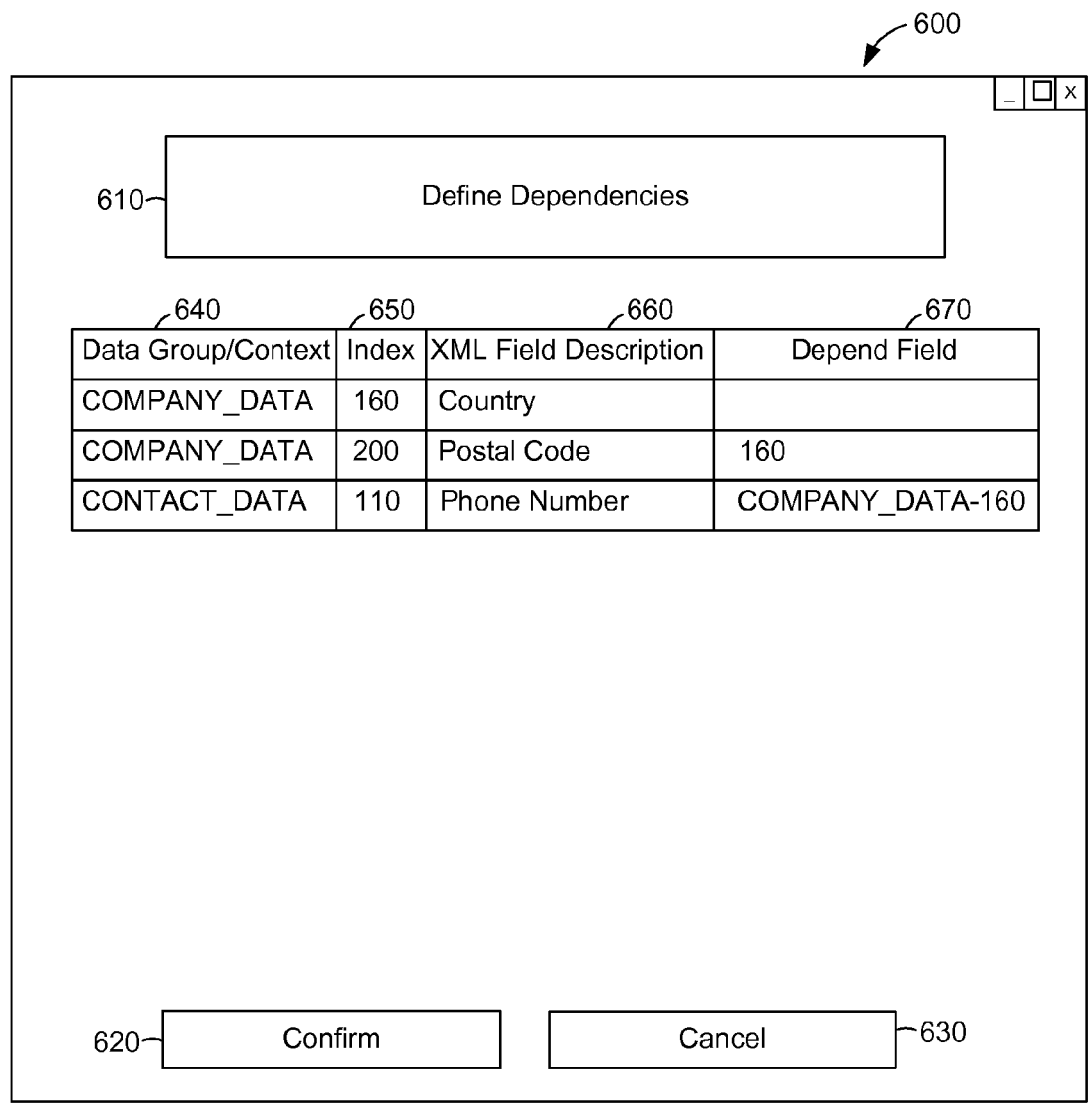
FIG. 6 is a block diagram illustrating a user interface in a system suitable for implementing a staging engine, according to some example embodiments.

FIG. 6 is a block diagram illustrating a user interface in a system suitable for implementing a staging engine, according to some example embodiments. FIG. 6 shows the user interface 600 including a title 610, columns 640, 650, 660, and 670, and buttons 620 and 630. In some example embodiments, the UI 600 is presented by the UI module 210 or 310. The title 610 may inform the user of the object being viewed, the application being used, or any suitable combination thereof. Each row in the table (composed of columns 640, 650, 660, and 670) may contain data regarding one data field. The data in column 640 may indicate the data group or context of the field (for example, COMPANY_DATA or CONTACT_DATA). The data in column 650 may indicate the index of the field within the data group or context (for example, 110, 160, or 200). The data group or context combined with the index may give a unique identifier for the field, e.g., COMPANY_DATA-160. The data in column 660 may indicate an XML field description for the field. The XML field description may be a machine-readable or a human-readable name for the field, e.g., Country, Postal Code, or Phone Number. The data in column 670 may indicate one or more dependencies for the field. For example, a postal code may identify an area within a country and thus be preferentially stored only when the corresponding country is known. In the example shown, this is indicated by the value 160 in the depend field. Since the postal code field and the country field are both part of the COMPANY_DATA data group, the depend field can be identified by index alone. Similarly, a phone number for a contact person may depend on the country of the company by which the person is employed. In this case, when the phone number field is part of the CONTACT_DATA data group, the depend field is identified by the full unique identifier of COMPANY_DATA-160. The column 660 may contain a field description that describes the data stored in the field. The "confirm" button 620 may be operable to confirm edits made and submit them to the private machine 130 for storage. The "cancel" button 630 may be operable to void the edits made.

The defined dependencies may provide criteria by which the staging engine chooses to stage data. For example, if a user enters data that has no dependencies, that data may be able to be stored immediately. As another example, if a user enters data that depends on data that has not yet been entered, the staging engine may hold that data until the data it depends on (e.g., the supporting data) has been entered, and then store both the supporting data and the dependent data. In some cases, data fields have multiple dependencies, and the staging may be more complex. For example, if field A depends on fields B and C, and field C depends on field D, the user may enter the data in the order A, B, C, D. In this case, field A may not be stored until all of B, C, and D, have been received; field B may be stored immediately, as it has no dependencies; field C may not be stored until field D is received; and field D may be stored immediately, as it has no dependencies.

Figure 7:
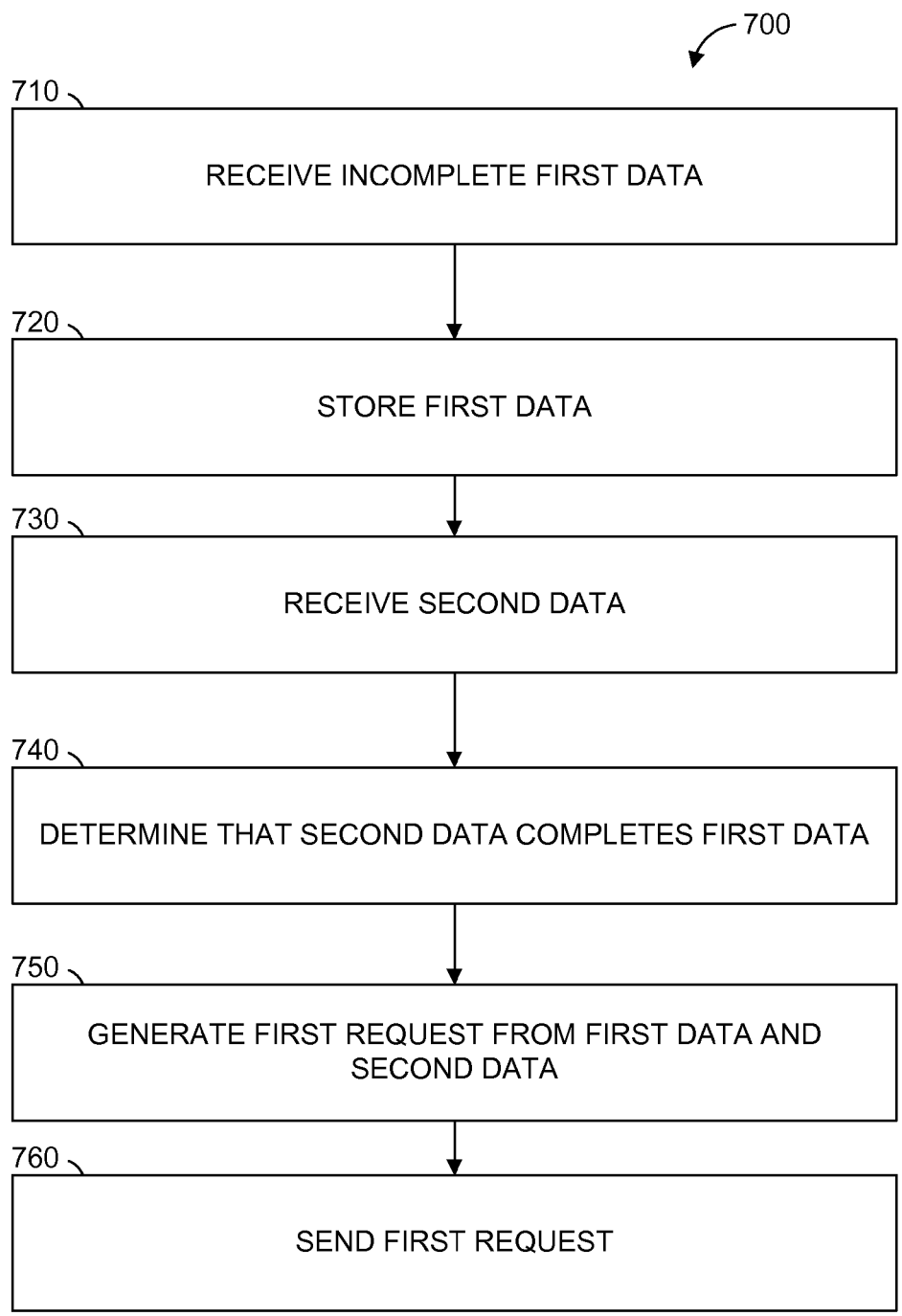
FIGS. 7-9 are flow diagrams illustrating operations of one or more devices in implementing a staging engine, according to some example embodiments.

FIG. 7 is a flow diagram illustrating operations of one or more devices in implementing a staging engine, according to some example embodiments. Operations in the method 700 may be performed by the public machine 110, using modules described above with respect to FIG. 2. As shown in FIG. 7, the method 700 includes operations 710, 720, 730, 740, 750, and 760.

Prior to execution of the method 700, the public machine 110 may present a user interface to a user (e.g., send a web page using UI module 210 to a device 140, 150). The user interface may be operable to submit one or more parameters to the public machine 110. The public machine 110 may receive first data from the user interface (operation 710) that is incomplete relative to data expected by the private machine 130 for the transaction the data relates to. For example, when adding a new user, the private machine 130 may expect the user's complete name and address, but the data received may be missing the address. After receiving the incomplete data, the public machine 110 may store the data (operation 720), e.g., by using the data module 240. The public machine 110 may receive second data (operation 730), e.g., via the UI module 210 and the network module 230. After receiving the second data, the business module 220 may determine that the second data completes the first data (operation 740). For example, the second data may provide the address that was not present in the first data. Based on determining that the second data completes the first data, the business module 220 may generate a request comprising the complementary fields (operation 750). Once the request is formed, the network module 230 may transmit the completed request to the private machine 130 (operation 760).

Figure 8:
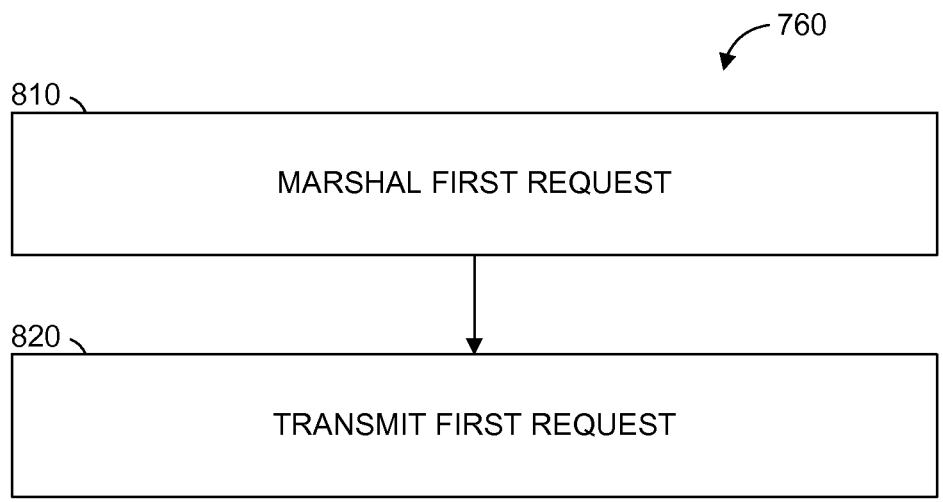

FIG. 8 is a flow diagram illustrating operations of one or more devices in implementing a staging engine, according to some example embodiments. Operations 810 and 820 may be performed by the public machine 110 in performing operation 760 of the method 700, using modules described above with respect to FIG. 2.

The network module 230 may marshal the request being sent from the public machine 110 to the private machine 130 (operation 810), e.g., by serializing the data for transmission over the network. The network module 230 may then transmit the marshaled request (operation 820). After receiving the marshaled data, the communication module 330 of the private machine 130 may unmarshal the data before processing it.

Figure 9:
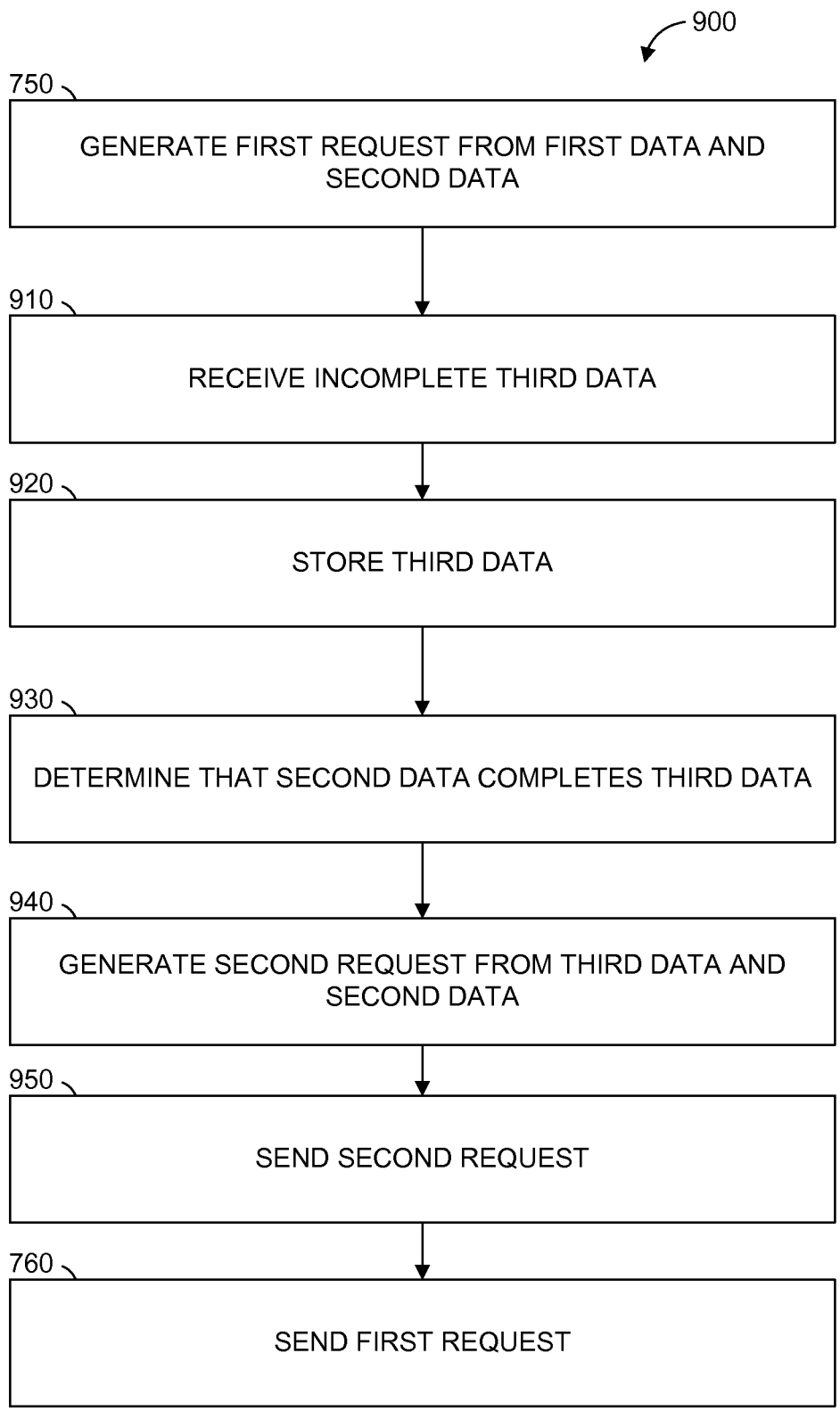

FIG. 9 is a flow diagram illustrating operations of one or more devices in implementing a staging engine, according to some example embodiments. Operations in the method 900 may be performed by the public machine 110, using modules described above with respect to FIG. 2. As shown in FIG. 9, the method 900 includes additional operations that may be performed as part of the method 700, beginning with operation 750, continuing with operations 910, 920, 930, 940, and 950, and completing with operation 760.

After creating the first request based on the first data and the second data (operation 750), the staging engine may determine that the first request depends on a second request to be processed before the first request. In this case, the staging engine may hold the first request until the second request can be created and processed. As an example, the public machine 110 may receive third data (operation 910), e.g., through the communication module 230, and determine that it is incomplete. After receiving the incomplete third data, the public machine 110 may store the data (operation 920), e.g., by using the data module 240. After receiving the third data, the business module 220 may determine that the second data completes the third data (operation 930). Based on determining that the second data completes the third data, the business module 220 may generate a request comprising the complementary fields (operation 940). Once the request is formed, the network module 230 may transmit the completed request to the private machine 130 (operation 950). After transmitting the second request, the business module 220 may determine that the first request may be handled by the private machine 130, and transmit the second request (operation 760), e.g., via the communication module 230.

According to various example embodiments, one or more of the methodologies described herein may facilitate protected access to data stored in a private machine. Moreover, one or more of the methodologies described herein may facilitate improved UI design not tightly coupled to the structure of data storage.

When these effects are considered in aggregate, one or more of the methodologies described herein may obviate a need for certain efforts or resources that otherwise would be involved in accessing protected data. Efforts expended by an administrator in providing access to data may be reduced by one or more of the methodologies described herein. Efforts expended by users in modifying or accessing data may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 10:
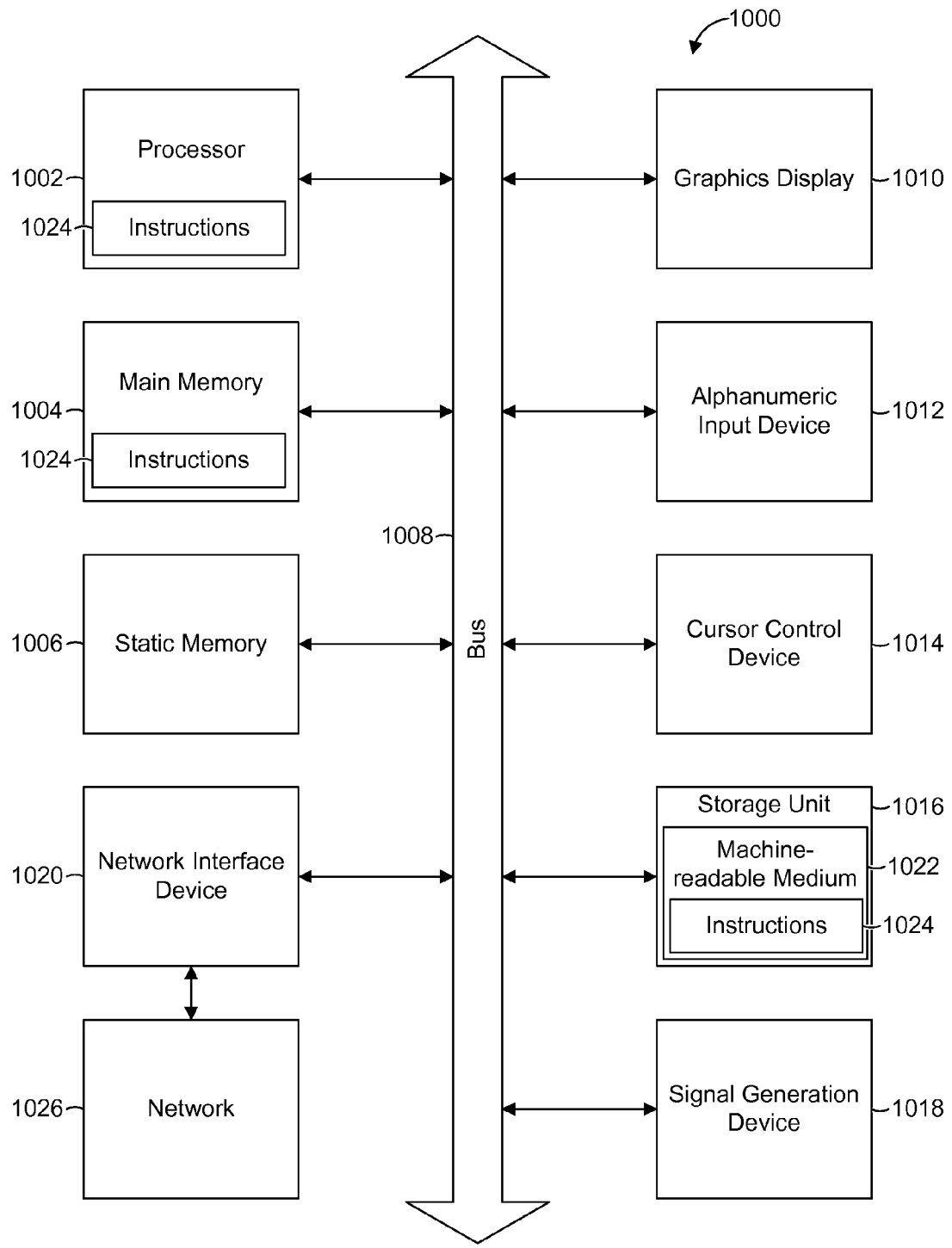
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system and within which instructions 1024 (e.g., software, a program, an application, an applet, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 190) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software)

or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems (e.g., apparatus) discussed herein:

1. A method comprising:
receiving first data that is insufficient to comply with a form of a first request, the first data received from a first machine;
storing the first data;
receiving second data that is insufficient to comply with the form of the first request, the second data received from a second machine;
determining with a processor of a machine that the second data completes the first data;
generating the first request using elements of the first data and elements of the second data; and
sending the first request to a third machine, the third machine configured to process the first request.

2. The method of description 1, wherein:
sending the first request includes marshalling the first request.

3. The method of description 1 or description 2, wherein:
the first machine and the second machine are the same machine.

4. The method of any of descriptions 1-3, further comprising:
receiving third data that is insufficient to comply with the form of a second request;
determining that the third data is incomplete;
storing the third data;
determining that the second data completes the third data;
generating the second request using elements of the third data and elements of the second data; and
sending the second request to the third machine, the third machine configured to process the second request.

5. The method of description 4, further comprising:
determining that the first request is incomplete;
storing a portion of the first request;
determining that a portion of the second request completes the first request;
combining the second request with the portion of the first request; and
processing the combined request.

6. The method of description 4 or description 5, wherein:
the first data is received before the second data;
the second data is received before the third data; and
the second request is sent before the first request is sent.

7. The method of description 6, wherein:
sending the second request configures the third machine to process the first request.

8. A system comprising:
a memory; and
one or more processors configured to:
receive first data that is insufficient to comply with a form of a first request, the first data received from a first machine;
store the first data;
receive second data that is insufficient to comply with the form of the first request, the second data received from a second machine;
determine that the second data completes the first data;
generate the first request using elements of the first data and elements of the second data; and
send the first request to a third machine, the third machine configured to process the first request.

9. The system of description 8, wherein the one or more processors are further configured to:
marshal the first request.

10. The system of description 8 or description 9, wherein:
the first machine and the second machine are the same machine.

11. The system of any of descriptions 8-10, wherein the one or more processors are further configured to:
receive third data that is insufficient to comply with the form of a second request;
determine that the third data is incomplete;
store the third data;
determine that the second data completes the third data;
generate the second request using elements of the third data and elements of the second data; and
send the second request to the third machine, the third machine configured to process the second request.

12. The system of description 11, wherein the one or more processors are further configured to:
determine that the first request is incomplete;
store a portion of the first request;
determine that a portion of the second request completes the first request;
combine the second request with the portion of the first request; and
process the combined request.

13. The system of description 11 or description 12, wherein:
the first data is received before the second data;
the second data is received before the third data; and
the second request is sent before the first request is sent.

14. The system of description 13, wherein:
sending the second request configures the third machine to process the first request.

15. A non-transitory machine-readable storage medium comprising instructions that, when executed by one or more processors of a machine, cause the machine to perform operations comprising:
receiving, using a processor of a machine, first data that is insufficient to comply with a form of a first request, the first data received from a first machine;
storing the first data;
receiving second data that is insufficient to comply with the form of the first request, the second data received from a second machine;
determining with a processor of a machine that the second data completes the first data;
generating the first request using elements of the first data and elements of the second data; and
sending the first request to a third machine, the third machine configured to process the first request.

16. The non-transitory machine-readable storage medium of description 15, wherein:
sending the first request includes marshalling the first request.

17. The non-transitory machine-readable storage medium of description 15 or description 16, wherein:
the first machine and the second machine are the same machine.

18. The non-transitory machine-readable storage medium of any of descriptions 15-17, wherein the operations further comprise:
receiving third data that is insufficient to comply with the form of a second request;
determining that the third data is incomplete;
storing the third data;
determining that the second data completes the third data;
generating the second request using elements of the third data and elements of the second data; and
sending the second request to the third machine, the third machine configured to process the second request.

19. The non-transitory machine-readable storage medium of description 18, wherein the operations further comprise:
determining that the first request is incomplete;
storing a portion of the first request;
determining that a portion of the second request completes the first request;
combining the second request with the portion of the first request; and
processing the combined request.

20. The non-transitory machine-readable storage medium of description 18 or description 19, wherein:
the first data is received before the second data;
the second data is received before the third data; and
the second request is sent before the first request is sent.

What is claimed is:

1. A method comprising:
receiving, by a server, first data that is incomplete, the first data received from a first machine over a first network, the first data for transfer to a third machine over a second network;
storing the first data;
receiving by the server, second data from a second machine over the first network;
determining, by the server, that the second data completes the first data;
responsive to the determination that the second data completes the first data, completing the first data with the second data; and
sending, by the server, the completed first data to the third machine over the second network.

2. The method of claim 1, wherein:
sending the completed first data request includes marshalling the completed first data.

3. The method of claim 1, wherein:
the first machine and the second machine are different machines.

4. The method of claim 1, further comprising:
receiving third data;
determining that the third data is incomplete;
responsive to the determination that the third data is incomplete, storing the third data;
determining that the second data completes the third data;
completing the third data with the second data; and
sending the completed third data to the third machine.

5. The method of claim 4, wherein:
the first data is received before the second data;
the second data is received before the third data; and
the completed third data is sent before the completed first data is sent.

6. The method of claim 1, wherein the determining that the second data completes the first data comprises:
determining that the first data comprises data for a first field;
determining that the first field depends on a second field;
determining that the first data lacks data for the second field; and
determining that the second data comprises data for the second field.

7. The method of claim 1, wherein:
the first network is a public network; and
the second network is a private network.

8. A system comprising:
a memory; and
one or more processors configured to perform operations comprising:

receiving first data that is incomplete, the first data received from a first machine over a first network, the first data for transfer to a third machine over a second network;

storing the first data;

receiving second data from a second machine over the first network;

determining that the second data completes the first data; and sending the completed first data to the third machine over the second network.

9. The system of claim 8, wherein sending the completed first data includes marshalling the completed first data.

10. The system of claim 8, wherein:

the first machine and the second machine are the different machines.

11. The system of claim 8, wherein the operations further comprise:

receiving third data;

determining that the third data is incomplete;

responsive to the determination that the third data is incomplete, storing the third data;

determining that the second data completes the third data; and sending the completed third data to the third machine.

12. The system of claim 11, wherein:

the first data is received before the second data;

the second data is received before the third data; and the completed third data is sent before the completed first data is sent.

13. The system of claim 8, wherein the determining that the second data completes the first data comprises:

determining that the first data comprises data for a first field;

determining that the first field depends on a second field;

determining that the first data lacks data for the second field; and determining that the second data comprises data for the second field.

14. A non-transitory machine-readable storage medium comprising instructions that, when executed by one or more processors of a machine, cause the machine to perform operations comprising:

receiving, using a processor of a machine, first data that is incomplete, the first data received from a first machine over a first network, the first data for transfer to a third machine over a second network;

storing the first data;

receiving second data from a second machine over the first network;

determining with a processor of a machine that the second data completes the first data; and sending the completed first data to the third machine over the second network.

15. The non-transitory machine-readable storage medium of claim 14, wherein:

sending the completed first data includes marshalling the first request.

16. The non-transitory machine-readable storage medium of claim 14, wherein:

the first machine and the second machine are different machines.

17. The non-transitory machine-readable storage medium of claim 14, wherein the operations further comprise:

receiving third data;

determining that the third data is incomplete;

responsive to the determination that the third data is incomplete, storing the third data;

determining that the second data; and sending the completed third data to the third machine.

18. The non-transitory machine-readable storage medium of claim 17, wherein:

the first data is received before the second data;

the second data is received before the third data; and the completed third data is sent before the completed first data is sent.

19. The non-transitory machine-readable medium of claim 14, wherein the determining that the second data completes the first data comprises:

determining that the first data comprises data for a first field;

determining that the first field depends on a second field;

determining that the first data lacks data for the second field; and determining that the second data comprises data for the second field.

* * * * *